United States Patent [19]

Kishimoto et al.

[11] Patent Number: 4,476,426
[45] Date of Patent: Oct. 9, 1984

[54] ONE-TERMINAL TYPE LEVEL CONTROL CIRCUIT

[75] Inventors: Satoru Kishimoto; Masaharu Atsumi, both of Kakogawa; Yoshiaki Sano, Kawasaki, all of Japan

[73] Assignees: Fujitsu Ten Limited, Kobe; Fijitsu Limited, Kawasaki, both of Japan

[21] Appl. No.: 384,633

[22] Filed: Jun. 3, 1982

[30] Foreign Application Priority Data

Jun. 5, 1981 [JP] Japan ................... 56-86450

[51] Int. Cl.³ .............................. H02H 9/04
[52] U.S. Cl. ................... 323/226; 307/549; 307/558; 323/299; 361/91
[58] Field of Search ............. 323/233, 226, 299; 330/207 P; 361/91; 307/540, 549, 557, 558, 10 R, 200 A

[56] References Cited

U.S. PATENT DOCUMENTS 3,124,697 3/1964 Trenchard .................... 361/91

FOREIGN PATENT DOCUMENTS 2123362 12/1971 Fed. Rep. of Germany ........ 357/41

Primary Examiner—William H. Beha, Jr.
Attorney, Agent, or Firm—Staas & Halsey

[57] ABSTRACT

A constant-current source transistor, which exhibits a constant-current characteristic corresponding to the power source voltage of a sensor and is connected to an input signal terminal of an input circuit, such as a microprocessor. A first transistor is connected so that it may supply a current from the power source of the input circuit to the constant-current source transistor, and a second transistor is connected in parallel to the constant-current source transistor. When the signal level at the input signal terminal exceeds a predetermined value, the second transistor is turned ON to effect level control so the input signal level may not become excessively high and damage the input circuit.

7 Claims, 11 Drawing Figures

ONE-TERMINAL TYPE LEVEL CONTROL CIRCUIT

BACKGROUND OF THE INVENTION

1. Field of the Invention

The present invention relates to a one-terminal type level control circuit for preventing an input signal from a sensor to a signal processing circuit, such as a microprocessor or the like, from becoming excessively large.

2. Description of the Prior Art

It is well-known in the art to employ in an automotive vehicle or the like a system that controls respective parts, such as an engine, in accordance with an output signal from various sensors, such as a temperature sensor, a pressure sensor and so forth. For instance, as shown in FIG. 1, ON-OFF or analog output signals are applied, via resistors R21 to R2n, to a microprocessor μCPU of centralized control equipment CONT from sensors S1 to Sn in accordance with temperature, pressure and so forth. A voltage $V_B$ of a battery B mounted on a vehicle is converted, by a stabilized power source circuit PW composed of a DC-DC converter and so on, into a power source voltage $V_{CC}$ of the microprocessor μCPU, for example 5 V, which is provided to the sensors S1 to Sn via resistors R11 to R1n, respectively. Capacitors C1 to Cn and Ca1 to Can are provided for removing noise. Reference characters D11 to D1n and D21 to D2n indicate diodes.

The sensors S1 to Sn and the centralized control equipment CONT are usually located at remote positions and, accordingly, their grounding points are provided at different positions on the body of the vehicle. Consequently, a potential difference may sometimes occur between the grounding points with respect to their grounding resistance values of the vehicle body. For instance, in the case where the potentials at the grounding points of the sensors S1 to Sn have risen higher than the potential at the grounding point of the centralized control equipment CONT, the microprocessor μCPU may be supplied with sensor output signals of levels higher than a predetermined value. The diodes D11 to D1n and D21 to D2n, and the capacitors C1 to Cn, are provided to hold the input level at the predetermined value in such a case, protecting the microprocessor μCPU.

In the prior art example, since the power source of the microprocessor μCPU is used as a power source for the sensors S1 to Sn, the capacitance of the stabilized power source circuit PW must be made large, and a sensor having an independent power source cannot be connected directly to the centralized control equipment. Furthermore, the noise preventing effect of the capacitors C1 to Cn is small. In the case where they are connected to the side of the input terminal of the microprocessor μCPU, as is the case with the capacitors Ca1 to Can shown, the noise preventing effect is large, but the microprocessor μCPU formed as an integrated circuit may be damaged by charges stored in the capacitors Ca1 to Can.

SUMMARY OF THE INVENTION

It is an object of the present invention to provide a level control circuit which automatically performs level control so that no excessively high input signal may be applied to the microprocessor when a battery voltage, higher than the power source voltage of the microprocessor, is provided to a sensor.

Briefly stated, the level control circuit of the present invention is connected to a signal input terminal of an input circuit, such as a microprocessor, for processing a signal. A constant-current power source transistor with a constant-current characteristic, in accordance with the power source voltage of the sensor, is connected to the input signal terminal. A first transistor is connected so that a current may be supplied from the power source of the input circuit to the constant-current power source transistor, and a second transistor is connected in parallel to the constant-current transistor. When the signal level at the signal input terminal has exceeded a predetermined value, the second transistor is turned ON to prevent the input signal level from becoming excessively high.

DESCRIPTION OF THE PREFERRED EMBODIMENTS

Figure 1:
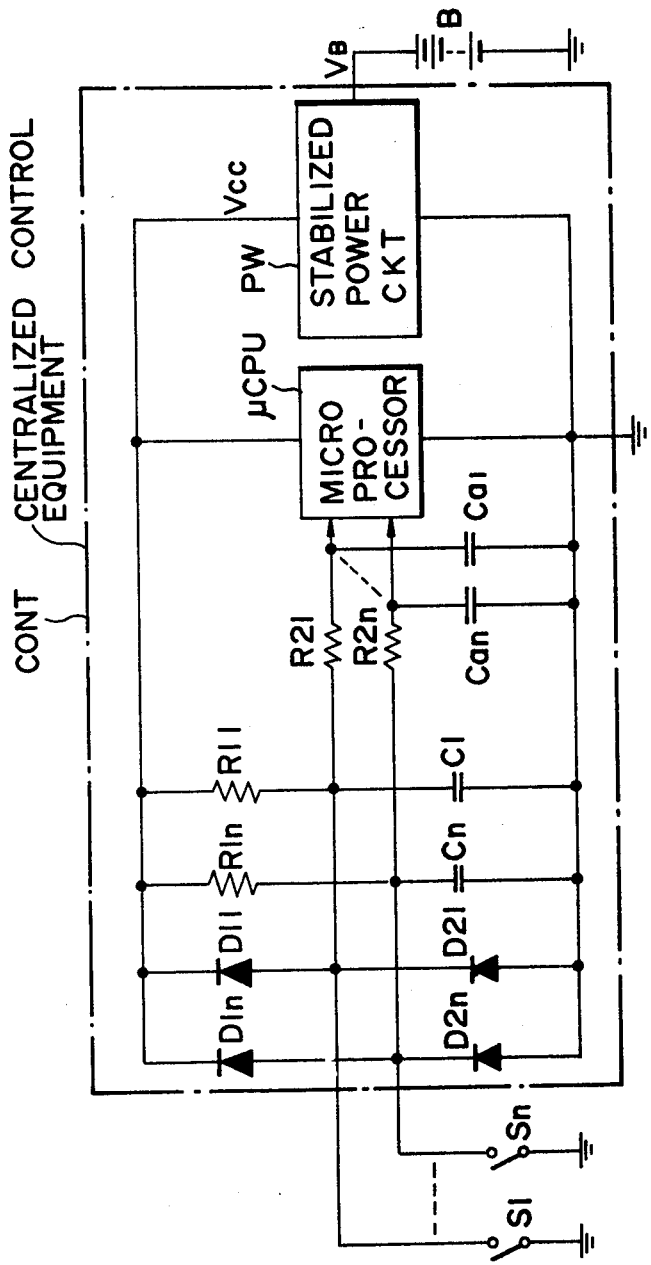
FIG. 1 is a block diagram of conventional centralized control equipment for sensors.
Figure 2:
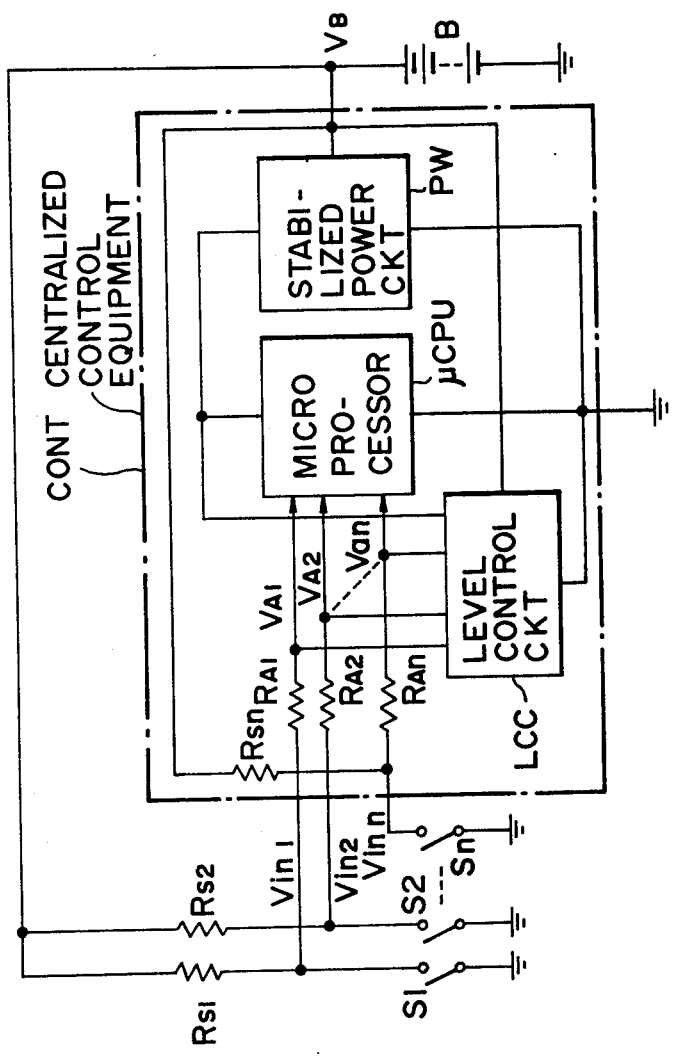
FIG. 2 is a block diagram of an embodiment of the present invention.

FIG. 2 is a block diagram of an embodiment of the present invention in which the voltage $V_B$ of the battery B is applied to the sensors S1 to Sn via resistors $R_{S1}$ to $R_{Sn}$, respectively, and the output signals from the sensors S1 to Sn are provided via resistors $R_{A1}$ to $R_{An}$ to the microprocessor μCPU. A one-terminal type level control circuit LCC for controlling the input signal level of the microprocessor μCPU is supplied with the voltage $V_B$ of the battery B and the voltage $V_{CC}$ of the stabilized power source circuit PW. By the one-terminal type level control circuit LCC, input signals $V_{A1}$ to $V_{An}$ to the microprocessor μCPU are controlled within a range of a predetermined level even if input signals $Vin_1$ to $Vin_n$ to the centralized control equipment CONT, i.e., the sensor output signals, exceed the predetermined level or become negative in level due to fluctuations in the ground potential and in the battery voltage or noise.

Figure 3:
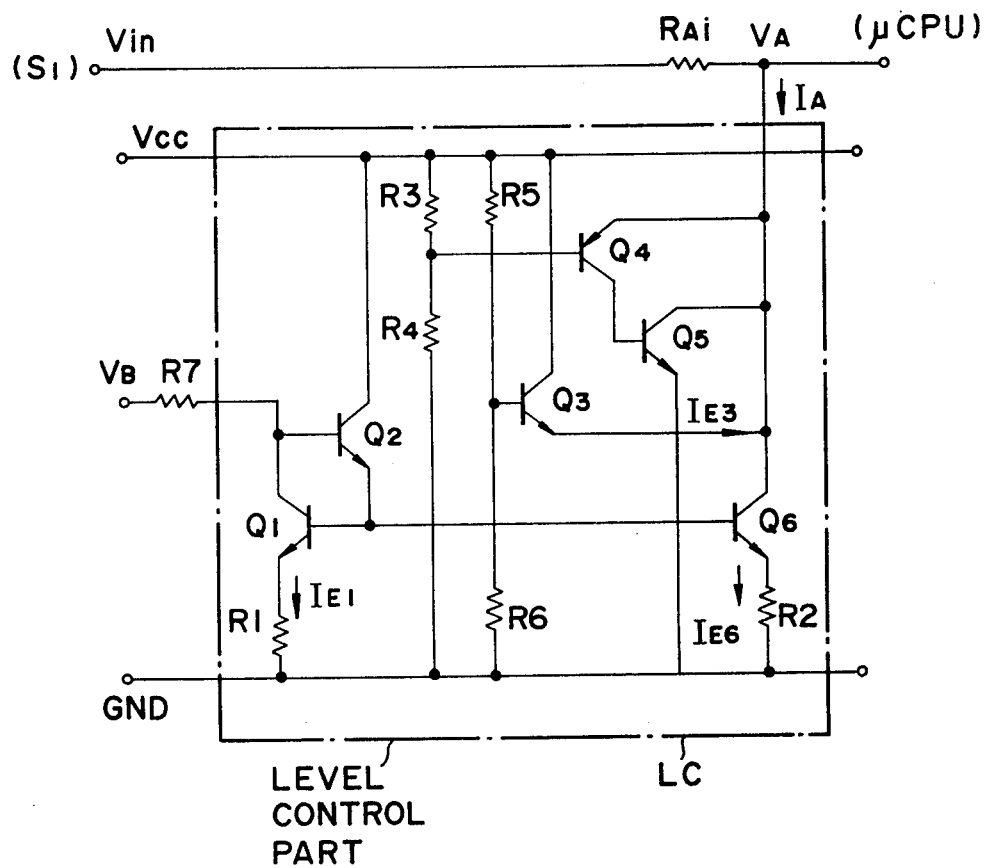
FIG. 3 is a circuit diagram of the principal part of the embodiment of the present invention.

FIG. 3 is a circuit diagram of the principal part of the embodiment of the present invention, showing a circuit corresponding to one sensor Si. In FIG. 3, reference character $R_{Ai}$ is a resistor connected between the sensor Si and the input terminal of the microprocessor μCPU;

LC designates a level control part; Q1 to Q6 identify transistors; and R1 to R7 denote resistors. The sensor output signal, i.e., the input signal Vin, is controlled by controlling current $I_A$ to the level control part LC so that the output signal $V_A$ may be within a range of a predetermined level of the microprocessor μCPU. The voltage $V_{CC}$ of the stabilized power source PW and the voltage $V_B$ of the battery B are applied to the level control part LC, and a terminal GND is grounded.

Figure 4:
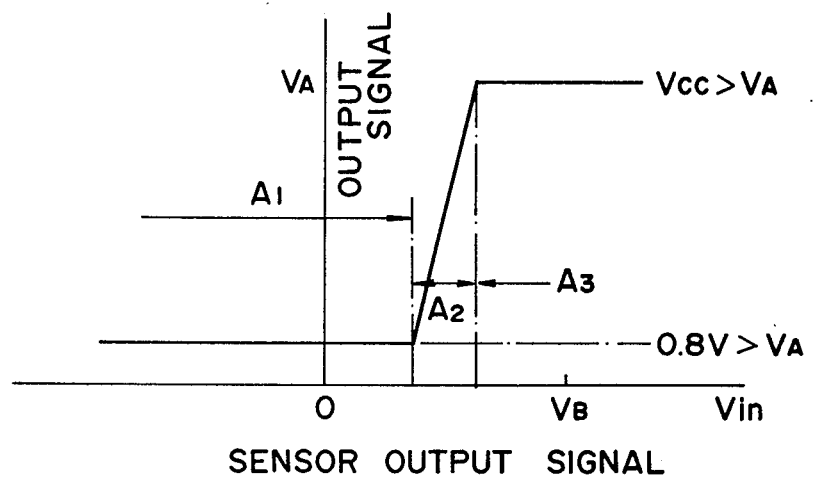
FIG. 4 is a graph of level control characteristics of the present invention.

FIG. 4 is a graph of level control characteristic curves, the abscissa representing the input signal Vin of the centralized control equipment CONT and the ordinate representing the output signal $V_A$, i.e., the input signal to the microprocessor μCPU. The characteristic can be divided into three regions, A1 to A3.

In the region A1, the output signal $V_A$ is held at a low-level even in the case where the input signal Vin is low-level and the sensor grounding potential is higher than the grounding potential of the centralized control equipment CONT. The emitter current $I_{E1}$ of the transistor Q1 in FIG. 3 is given by the following expression:

$$I_{E1} = \frac{V_B - (V_{BE1} + V_{BE2})}{R7 + R1} \quad (1)$$

where $V_{BE1}$ and $V_{BE2}$ are base-emitter voltages of the transistor Q1 and Q2.

Since the bases of the transistors Q1 and Q6 are connected in common to the emitter of the transistor Q2, the emitter current $I_{E6}$ of the transistor Q6 becomes as follows:

$$I_{E6} = I_{E1} \cdot \frac{R1}{R2} \quad (2)$$

assuming that the transistors Q1 and Q6 are equal in the base-emitter voltage and in the emitter area. Assuming that the transistors Q4 and Q5, constituting a second group of transistors connected in parallel to the transistor Q6, are in the OFF state, the emitter current $I_{E6}$ is the sum of the emitter current $I_{E3}$ of the first transistor Q3 and the current $I_A$ of the input signal Vin. The current $I_A$ increases with an increase in the input signal Vin until it becomes equal to the emitter current $I_{E6}$. Accordingly, before the current $I_A$ becomes equal to the emitter current $I_{E6}$, the output signal $V_A$ is as follows.

$$V_A = R2 \cdot I_A + V_{CE(S)} \quad (3)$$

where $V_{CE(S)}$ is a collector-emitter saturation voltage of the transistor Q6. For instance, in the case of the input signal Vin being zero, the emitter current $I_{E3}$ of the transistor Q3 flows to the transistor Q6, the transistors Q4 and Q5 are in the OFF state, and the output signal $V_A$ becomes as follows:

$$V_A = V_{CC} \cdot \frac{R6}{R5 + R6} - V_{BE3} \quad (4)$$

where $V_{BE3}$ is a base-emitter voltage of the transistor Q3. Even in the case where the input signal Vin is low-level and the grounding potential fluctuates, the output signal $V_A$ is held at a low-level until $I_A$ becomes equal to the emitter current $I_{E6}$. In the case where the voltage $V_B$ of the battery B fluctuates, for instance, rises, and as a result the input signal Vin also rises, the emitter current $I_{E1}$ of the transistor Q1 increases to cause an increase in the emitter current $I_{E6}$ of the transistor Q6 and the current $I_A$ equal to $I_{E6}$ increases, suppressing an increase in the output voltage $V_A$. If the input signal Vin is a negative voltage, the above operation is carried out and the input signal Vin and the output signal $V_A$ bear the following relation:

$$-Vin = R_{Ai} \cdot (-I_A) + V_A \quad (5)$$

even if a noise voltage of negative polarity is input, no negative voltage is applied to the microprocessor μCPU.

The region A2 is a transient region in which the input signal changes from a low-level to a high-level. In the process in which the input signal Vin changes from a low-level to a high-level, since the current $I_A$ cannot be increased after it has become equal to the emitter current $I_{E6}$, the output signal $V_A$ becomes as follows:

$$V_A = Vin - R_{Ai} \cdot I_{E6} \quad (6)$$

and the output signal $V_A$ increases with an increase in the input signal Vin.

The region A3 is a region in which $V_A$ is clamped so as not to exceed the voltage $V_{CC}$ when the input signal Vin is a high-level. When the emitter potential of the transistor Q4 has risen higher than a potential at a branch point divided by the resistors R3 and R4 as a result of an increase in the input signal Vin, the transistors Q4 and Q5 are turned ON, allowing a portion of the current $I_A$ to flow to the transistor Q5. Consequently, the output signal $V_A$ becomes as follows:

$$V_A = V_{CC} \cdot \frac{R4}{R3 + R4} + V_{BE4} \quad (7)$$

where $V_{BE4}$ is a base-emitter voltage of the transistor Q4.

The input and output signals Vin and $V_A$ bear the following relation:

$$Vin = R_{Ai} \cdot I_A + V_A \quad (8)$$

Even if the input signal Vin rises, an increase in the current $I_A$ prevents the output signal $V_A$ from exceeding the predetermined level. In other words, even in the case of a noise voltage of positive polarity being applied or the battery voltage $V_B$ increasing, the microprocessor μCPU is supplied with a high-level signal within a range of the predetermined level, and hence, can be protected.

Figure 5:
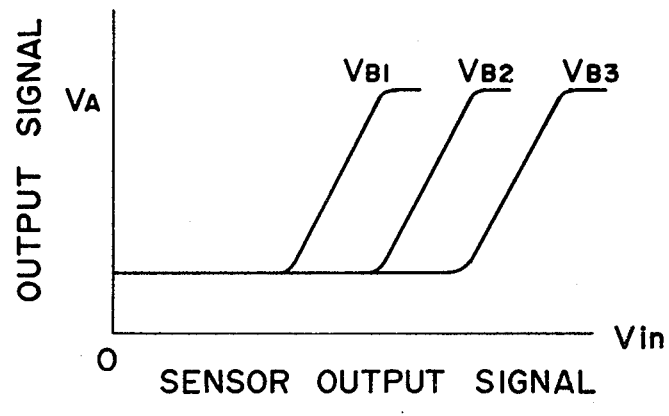
FIG. 5 is a graph of the relationship between input and output signals using a battery voltage as a parameter.

FIG. 5 is a graph showing the relation between the input and output signals Vin and $V_A$, using the voltage $V_B$ of the battery B as a parameter, the battery voltage $V_B$ undergoing variations $V_{B1} < V_{B2} < V_{B3}$. As the voltage $V_B$ of the battery B rises, the level of the sensor output also rises, but in the case of the sensor output signal being low-level, the output signal $V_A$ has the level that can be decided as low-level in the microprocessor μCPU as shown in Eq. (3), and even if the battery B is used as a power source for the sensors S1 to Sn, no malfunction is caused. In the case of the sensor output signal being high-level, the output signal $V_A$ stays within a range of the predetermined level because of the relations given by Eq. (7) and (8) and, consequently, there is no possibility of the microprocessor μCPU being damaged.

As described in the foregoing, according to the present invention, the transistor Q6 serves as a constant-current source and, by the provision of the transistors Q1 and Q2, it exhibits the constant-current characteristic corresponding to the power source voltage of the sensors S1 to Sn, for instance, the voltage $V_B$ of the battery B. By the provision of the transistor Q3, a current can be supplied to the transistor Q6 from the power source of the input circuit, for instance, the stabilized power source circuit PW (FIG. 2). Further, the transistors Q4 and Q5 are turned ON to bypass the current of the constant-current source transistor Q6 when the input signal level at the input terminal of the input circuit, such as the microprocessor μCPU, exceeds a predetermined value. If the input signal Vin becomes negative due to noise, or if the ground potential fluctuates, when the input signal Vin is low-level, the level of the output signal $V_A$ does not exceed the level that is decided as low-level in the input circuit, e.g., the microprocessor μCPU. Moreover, even in the case where the input signal Vin becomes higher than the power source voltage $V_{CC}$ of the microprocessor μCPU as a result of fluctuations of the voltage of the power source of the sensors S1 to Sn, such as the battery B, the output signal $V_A$ can be held within the range of the predetermined level because the transistors Q4 and Q5 bypass the current of the constant-current source transistor Q6. Even if noise of positive polarity is applied, the input circuit, such as the microprocessor μCPU, can be protected.

Even if the capacitors C1 to Cn and Ca1 to Can, and the diodes D11 to D1n and D21 to D2n used in the prior art example are omitted, malfunction due to noise is prevented and the input circuit can be protected; therefore, the signal processing circuit can be formed by MOS transistors and the like. In the input circuit of a C-MOS structure, such as the microprocessor μCPU, a phenomenon referred to as latch-up is caused by an input signal of negative polarity or an input signal of a level higher than the power source voltage $V_{CC}$, resulting in breakdown of the input circuit. According to the present invention, however, since the input signal to the input circuit is automatically controlled to be within a range of the predetermined level, such a defect is eliminated.

In the level control part LC, the transistors Q1 and Q2 and the resistors R1 and R3 to R7 are connected in common to the sensors. Transistors Q3 and Q6 and the resistor R2 are also provided for each of the sensors, therefore, in the case of a plurality of sensors being provided, a one-terminal type level control circuit can be fabricated as an integrated circuit.

Figure 6:
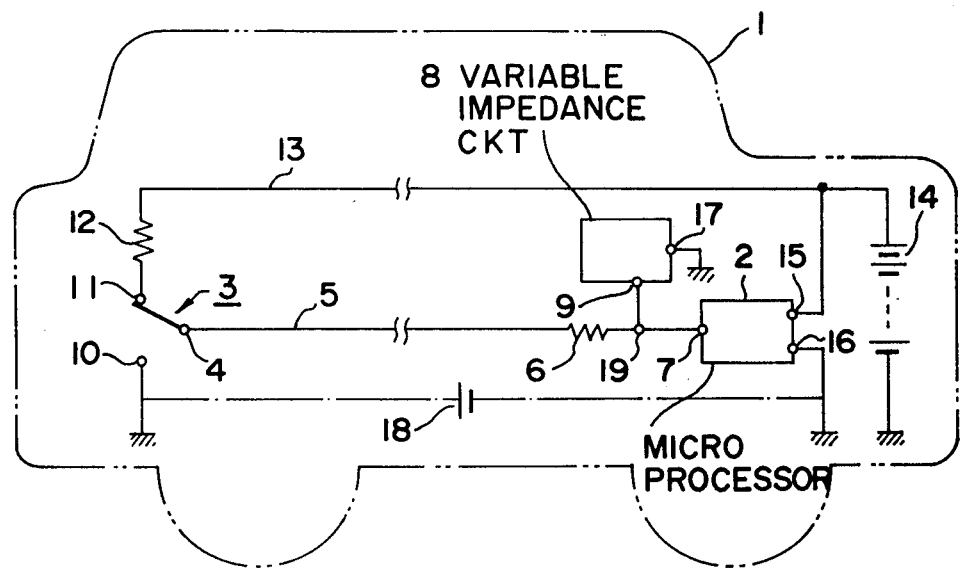
FIG. 6 is a circuit diagram of another embodiment of the present invention.

FIG. 6 is another embodiment of the present invention, in which an output signal from an ON-OFF type sensor 3 is processed by a microprocessor 2 mounted on an automotive vehicle 1. A DC power source 14 includes a stabilized power source circuit and a battery and, for the sake of simplicity is indicated as a battery. The sensor 3 is, for example, a temperature sensor, in which a movable contact 4 is changed over from the side of a contact 10 to the side of a contact 11 when a predetermined temperature is reached. The contact 10 is grounded, the contact 11 is connected to the DC power source 14 via a resistor 12 and a line 13, and the movable contact 4 is connected to an input terminal 7 of the microprocessor 2 via a line 5 and a resistor 6. An input terminal 9 of a variable impedance circuit 8 is connected to the input terminal 7. Reference numeral 15 indicates a power source terminal of the microprocessor 2, 16 designates a ground terminal of the microprocessor 2, 17 identifies a ground terminal of the variable impedance circuit 8, 18 denotes a battery indicating a voltage drop when the body of the vehicle 1 is used as a grounding conductor, and 19 represents a connection point of the input terminals 7 and 9.

The microprocessor 2 is used to process the output signal from the sensor 3 distinguishing a voltage applied to the input terminal 7. Thus, a voltage $V_{19}$ at the connection point 19 is either a logical "1" or "0". Since the sensor 3 is at a position remote from the microprocessor 2, a voltage drop indicated by the battery 18 is produced between the contact 10 and the ground terminal 16 of the microprocessor 2. The microprocessor 2 distinguishes the voltage $V_{19}$ as a logical "1", for instance, when it is higher than 2 V and a logical "0" in the case of a voltage lower than 0.8 V when the voltage drop $V_{18}$ indicated by the battery 18 is, for example, 2 V. If the movable contact 4 of the sensor 3 is in contact with the contact 10, the voltage $V_{19}$ at the connection point 19 becomes higher than 2 V and should be decided as a logical "0", but is decided as a logical "1". With the variable impedance circuit 8 connected, however, switching control of the impedance is carried out to prevent an erroneous decision of logical "1" and "0".

Figure 7:
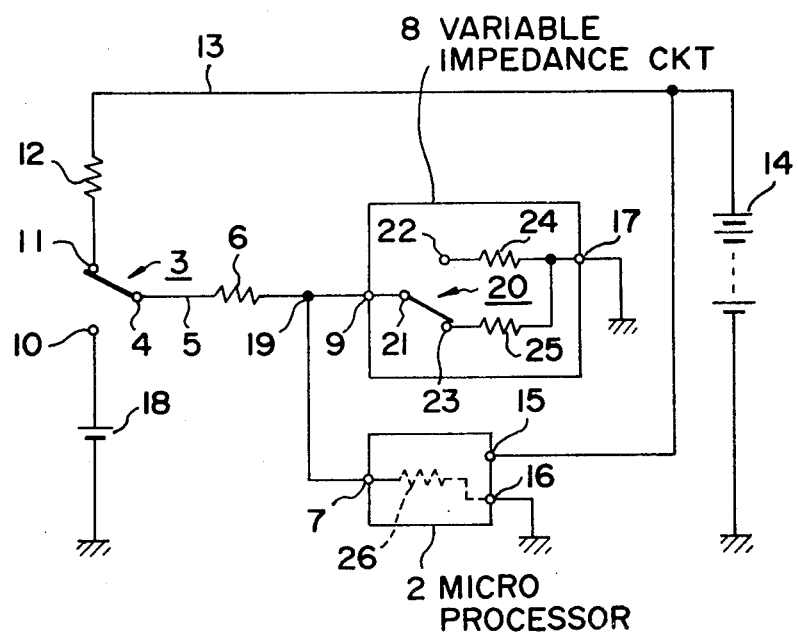
FIG. 7 is an equivalent circuit diagram of the embodiment shown in FIG. 6.

FIG. 7 is an equivalent circuit diagram of the embodiment of FIG. 6, the parts corresponding to those in FIG. 6 being identified by the same reference numerals. The variable impedance circuit 8 comprises a switching element 20 and resistors 24 and 25. The switching element 20 can be formed by a transistor or the like but it is shown as a changeover switch composed of a movable contact 21 and contacts 22 and 23. The impedance as viewed from the input terminal 7 of the microprocessor 2 is indicated by a resistor 26.

Figure 8:
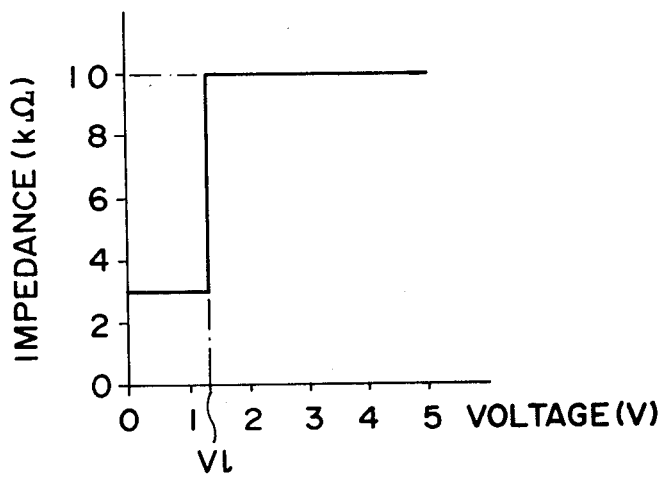
FIG. 8 is a graph of the characteristic of the variable impedance circuit in FIG. 7.

FIG. 8 is a graph of the characteristic of the variable impedance circuit in connection with the case where the resistance value $R_{24}$ of the resistor 24 is 10 KΩ and the resistance value $R_{25}$ of the resistor 25 is 3 KΩ. The operation of the switching element 20 is performed in accordance with the input voltage to the input terminal 9 by a known structure not shown. The switching operation is carried out so that, for instance, when the voltage $V_{19}$ at the connection point 19 has exceeded a predetermined voltage Vl, for example, 1.1 V, the movable contact 21 is contacted with the contact 22, and when the voltage $V_{19}$ is lower than 1.1 V, the movable contact 21 is contacted with the contact 23.

Figure 9:
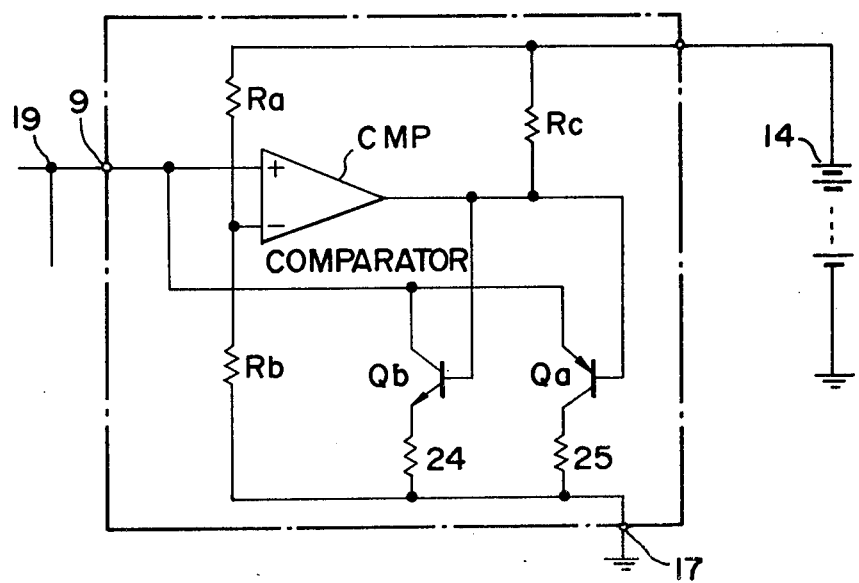
FIG. 9 is a circuit diagram of another variable impedance circuit.

FIG. 9 is a circuit diagram of an example of the variable impedance circuit. The voltage $V_{14}$ of the DC power source 14 is divided by resistors Ra and Rb, and the divided voltage is applied to a minus input terminal of a comparator CMP. The input voltage at the input terminal 9 of the impedance circuit is applied to a plus input terminal of the comparator CMP, wherein both input voltages are compared with each other. The comparator input signal is provided to the bases of a PNP transistor Qa and an NPN transistor Qb which constitute a switching element. To the PNP transistor Qa is connected resistor 25, a resistor 24 is connected to the NPN transistor Qb, and the resistors Rb, 24 and 25 are connected to a ground terminal 17.

When the input voltage at the input terminal 9 is, for example, lower than 1.1 V, the output signal from the comparator CMP becomes a low-level, turning ON the PNP transistor Qa, the movable contact 21 of the switching element 20 in FIG. 7 is changed over to contact the contact 23, and the resistor 25 is connected to the input terminal 9.

When the input voltage at the input terminal 9 becomes higher than 1.1 V, the output signal from the comparator CMP becomes a high-level, turning OFF the PNP transistor Qa and turning ON the NPN transistor Qb, the movable contact 21 of the switching element 20 is changed over to the contact 22, and the resistor 24 is connected to the input terminal 9.

Assuming that the movable contact 4 of the sensor 3 is in contact with the contact 11, and the movable contact 21 of the variable impedance circuit 8 is in contact with the contact 23, the voltage $V_{19}$ at the connection point 19 corresponds to a voltage produced by dividing the voltage $V_{14}$ of the DC power source 14 through the resistors 6 and 25. Assuming, for instance, that the voltage $V_{14}$ is 5 V, and the resistance value $R_6$ of the resistor 6 is 10 K$\Omega$, it follows that $$V_{19} = V_{14} \cdot \frac{R25}{R6 + R25} = 1.15[V] \quad (9)$$

In this case, since V1=1.1 V and $V_{19}$>V1, the switching operation of the switching element 20 is carried out. Accordingly, the voltage $V_{19}$ at the connection point 19 becomes as follows:

$$V_{19} = V_{14} \cdot \frac{R24}{R6 + R24} = 2.5[V] \quad (10)$$

and, from 2 (V)<$V_{19}$, the microprocessor 2 distinguishes the voltage as a logical "1". Since the resistance value of the resistor 26 is usually hundreds of kilo-ohms, the resistance values of the resistors 6, 24 and 25 can be neglected.

Assuming that the movable contact 4 of the sensor 3 is changed over to the contact 10 in the above state, when the voltage drop $V_{18}$ indicated by the battery 18 is 2 V, the voltage $V_{19}$ at the connection point 19 becomes as follows:

$$V_{19} = V_{18} \cdot \frac{R24}{R6 + R24} = 1.0[V] \quad (11)$$

In this case, since $V_{19}$<V1, the switching element 20 of the variable impedance circuit 8 performs such a changeover operation that the movable contact 21 is contacted with the contact 23. As a result of this, the voltage $V_{19}$ at the connection point 19 becomes as follows:

$$V_{19} = V_{18} \cdot \frac{R25}{R6 + R25} = 0.46[V] \quad (12)$$

and, from 0.8 (V)>$V_{19}$, the microprocessor 2 distinguishes the voltage $V_{19}$ as a logical "0".

Figure 10:
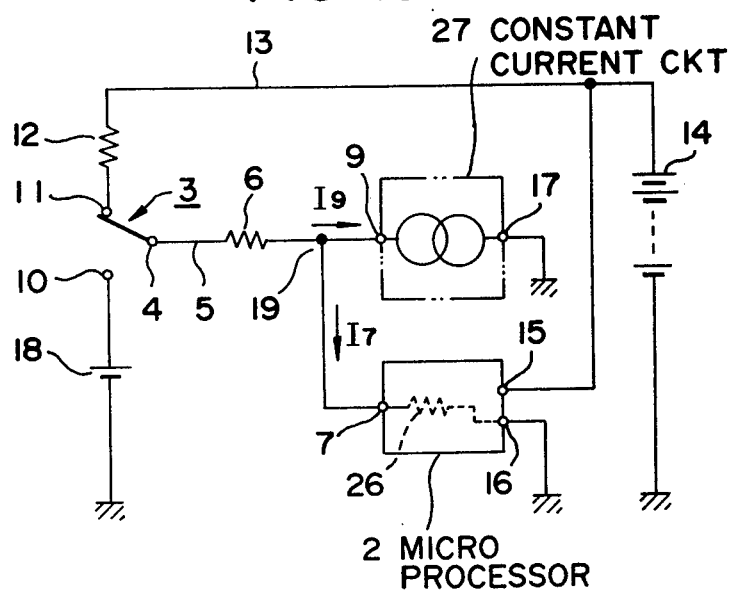
FIG. 10 is an equivalent circuit diagram of another embodiment of the present invention.
Figure 11:
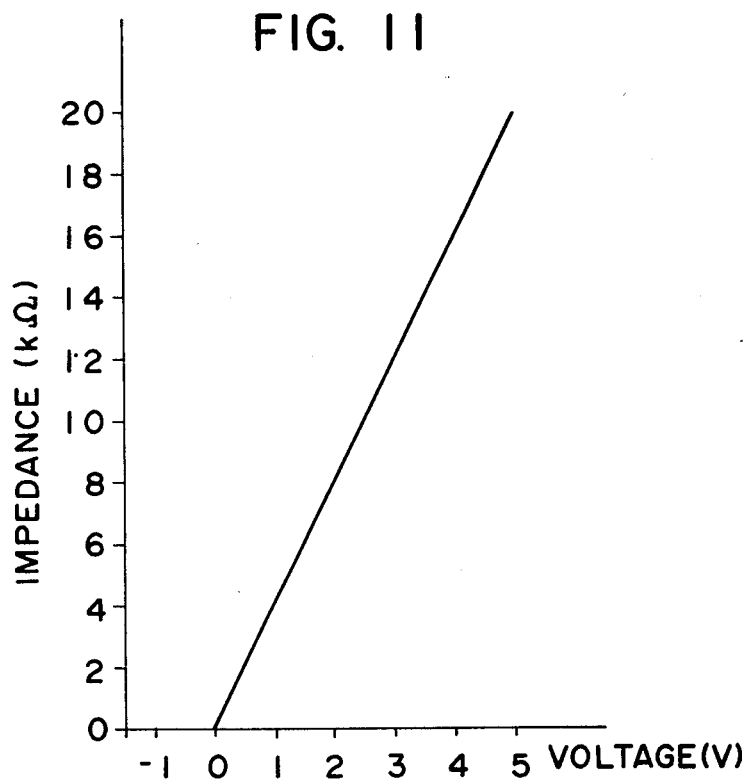
FIG. 11 is a graph of the characteristics of a constant-current circuit in FIG. 10.

FIG. 10 is a circuit diagram of another embodiment of the present invention, in which a constant-current circuit 27 is connected as the variable impedance circuit, the parts corresponding to those in FIG. 7 being identified by the same reference numerals. The impedance Rin of the constant-current circuit 27 changes with the voltage $V_{19}$ at the connection point 19 as shown in FIG. 11 because of current $I_9$ being constant. Assuming that the current $I_9$ is 0.25 mA, when the movable contact 4 of the sensor 3 remains in contact with the contact 11, the voltage $V_{19}$ at the connection point 19 is as follows:

$$V_{19} + V_{14} - I_9 \cdot R_6 = 5 - 0.25 \times 10^{-3} \times 10 \times 10^3 = 2.5[V] \quad (13)$$

A current $I_7$ which flows into the input terminal 7 of the microprocessor 2 is markedly small, as compared with the current $I_9$, and is negligible. Since the voltage given by Eq. (13) is higher than 2 V, the microprocessor 2 decides it as a logical "1".

In the state in which the movable contact 4 of the sensor 3 remains in contact with the contact 10, the voltage $V_{19}$ at the connection point 19 becomes as follows:

$$V_{19} = V_{18} - I_9 \cdot R_6 = 2 - 0.25 \times 10^{-3} \times 10 \times 10^3 = -0.5[VB] \quad (14)$$

But, since the constant-current circuit 27 has a characteristic as shown in FIG. 11, the voltage $V_{19}$ becomes zero. Accordingly, the microprocessor 2 decides the voltage $V_{19}$ as a logical "0" regardless of the voltage drop $V_{18}$.

It is apparent that many modifications and variations may be effected without departing from the scope of the novel concepts of the present invention.

What is claimed:

1. A one-terminal type level control circuit operatively connected to an input circuit having a signal input terminal, said one-terminal type level control circuit including a signal source circuit supplying a signal to the signal input terminal of the input circuit and including a resistor operatively connected between the signal source circuit and the signal input terminal, the signal source circuit operatively connectable to a first power source, for receiving a first operating voltage, and the input circuit operatively connectable to a second power source, for receiving a second operating voltage, said one terminal type level control circuit comprising:

an input terminal operatively connected to the signal input terminal; and constant current source means, operatively connected to said input terminal, for providing a constant current characteristic varying in accordance with the value of the first operating voltage so that said one-terminal type level control circuit maintains the voltage at the signal input terminal of the input circuit within a predetermined voltage range.

2. A one-terminal type level control circuit according to claim 1, further comprising current supply means, operatively connected to said constant current source means, for supplying current to said constant current source means when the voltage at the signal input terminal of the input circuit drops below the predetermined voltage range.

3. A one-terminal type level control circuit according to claim 1, further comprising clamp means, operatively connected to said input terminal of the level control circuit, for clamping the voltage at the signal input terminal within the maximum allowed voltage in the predetermined voltage range.

4. A one-terminal type level control circuit according to claim 1, wherein said constant current source means comprises a current circuit, operatively connected to receive the first operating voltage, for using the first operating voltage as a reference voltage.

5. A one-terminal type level control circuit according to claim 1, wherein the first power source comprises a battery, the first operating voltage being a voltage supplied from the battery and wherein the second power source comprises a stabilized power source circuit for stabilizing the voltage of the battery and outputting a stabilized voltage as the second operating voltage.

6. A one-terminal type level control circuit, operatively connected to an input circuit, a stabilized power source circuit, a sensor, and a resistor, the stabilized power source circuit being operatively connected to the input circuit and operatively connectable to receive a stabilized power source voltage, the sensor and resistor being operatively connectable to receive a power source voltage, the level control circuit receiving an output signal from the sensor and applying an input signal to an input terminal of the input circuit, the level of the input signal being held within a range of a predetermined level, the level control circuit comprising:

a constant-current source transistor, operatively connected to the input terminal of the input circuit and operatively connected to receive the input signal from the sensor, exhibiting a constant-current characteristic corresponding to the power source voltage of the sensor;

a first transistor, operatively connected to the stabilized power source circuit and to said constant current source transistor, for supplying a current from the stabilized power source circuit to said constant-current source transistor; and a second transistor, operatively connected to said input circuit and connected in parallel to said constant-current source transistor, for turning ON when the input signal level at the input terminal of the input circuit exceeds the range of the predetermined level.

7. A one-terminal type level control circuit according to claim 6, wherein said constant-current source transistor has a base, further comprising:

a third transistor, having a base operatively connected to said base of said constant-current source transistor and having a collector operatively connected to receive the power source voltage of the sensor; and a fourth transistor, having a base operatively connected to receive the power source voltage of the sensor, having a collector operatively connected to the stabilized power source circuit, and having an emitter operatively connected to said base of said third transistor and said base of said constant-current source transistor.

* * * * *

UNITED STATES PATENT AND TRADEMARK OFFICE
CERTIFICATE OF CORRECTION

PATENT NO. : 4,476,426
DATED : OCTOBER 9, 1984
INVENTOR(S) : SATORU KISHIMOTO ET AL.

It is certified that error appears in the above-identified patent and that said Letters Patent is hereby corrected as shown below:

Col. 6, line 46, "V1" should be --V$\ell$--.

Col. 7, line 23, "V1" (both occurrences) should be --V$\ell$--;

line 46, "V1," should be --V$\ell$,--.

Signed and Sealed this

Thirtieth Day of July 1985

[SEAL]

Attest:

DONALD J. QUIGG

*Attesting Officer*  *Acting Commissioner of Patents and Trademarks*

UNITED STATES PATENT AND TRADEMARK OFFICE
CERTIFICATE OF CORRECTION

PATENT NO. : 4,476,426
DATED : October 9, 1984
INVENTOR(S) : Satoru Kishimoto et al It is certified that error appears in the above-identified patent and that said Letters Patent is hereby corrected as shown below:

On the title page, Item (76) assignee, "Fijitsu" should be --Fujitsu--.

Signed and Sealed this

Twenty-ninth Day of October 1985

[SEAL]

Attest:

DONALD J. QUIGG

Attesting Officer

Commissioner of Patents and Trademarks—Designate